Patented Dec. 10, 1929

1,739,486

UNITED STATES PATENT OFFICE

LORIN B. SEBRELL, OF AKRON, OHIO, ASSIGNOR TO THE GOODYEAR TIRE & RUBBER COMPANY, OF AKRON, OHIO, A CORPORATION OF OHIO

METHOD OF PRODUCING ACCELERATORS FOR THE VULCANIZATION OF RUBBER

No Drawing.  Application filed August 1, 1924. Serial No. 729,516.

My invention relates to the production of accelerators for the vulcanization of rubber, and it is particularly concerned with the provision of a method of producing triphenylguanidine.

In the vulcanization of rubber, accelerators, or catalysts, of the vulcanizing process occupy an important position. The accelerators or catalysts are highly desirable, not only because they expedite the process, but also for the reason that the physical characteristics of the finished product may be considerably improved by a proper selection of an accelerator. The value of an accelerator, therefore, resides in a number of features, one of which is its cost. Although relatively small quantities of the accelerators are employed, in the production of large quantities of cured rubber the amount of accelerator is a material item. It is desirable, therefore, to obtain accelerators that are satisfactory not only from a standpoint of producing proper physical characteristics, but also from the nature of their source and the ease with which they may be produced. One of the principal objects, consequently, of the present invention, is to provide a method of efficiently producing tri-substituted guanidines, and in particular, triphenylguanidine, which has been found to be a satisfactory accelerator of rubber compounds intended for general application in the rubber industry.

Tri-substituted guanidines have been employed rather extensively heretofore as accelerators, and various methods have been utilized in their production. However, the present invention, it is believed, provides a new method which is more efficient in the production of these guanidines, and, in consequence, results in a lower cost of such materials. It should be noted, furthermore, that the method disclosed herein is particularly adapted for quantity production and is not, therefore, merely a laboratory method.

It has been suggested heretofore that tri-substituted guanidines, and in particular, triphenylguanidine, may be produced by employing a mixture of thiocarbanilide and aniline together with litharge for the purpose of desulfurization. Although triphenylguanidine may be obtained in a relatively pure state by properly manipulating such mixture and with a fairly satisfactory yield in percentage of the triphenylguanidine as compared to the possible theoretical yield, however, with such a mixture it is necessary to employ a rather large amount of aniline in excess of the theoretical amount necessary to obtain the accelerator. Moreover, the mixture must be heated to a temperature in the neighborhood of 125° C. for a period of somewhere between four and five hours, in order to obtain the proper reaction. It has now been discovered that if basic lead carbonate is employed, rather than litharge, the time of completing the reaction may be greatly reduced, as well as effecting a material decrease in the amount of aniline that must be employed. The triphenylguanidine may be readily produced by admixing a suitable amount of basic lead carbonate with thiocarbanilide and adding aniline to the mixture, which should be, however, in the neighborhood of 5% to 10% in excess of the theoretical amount necessary. If such mixture is heated to approximately 100° C. for forty-five to sixty minutes, about 90% of the theoretical yield of triphenylguanidine may be obtained, which will be found to be from 95% to 100% pure. It is apparent, therefore, that the temperature necessary to effect the reaction may not only be reduced, but also the time for completing such reaction is materially reduced. It is furthermore apparent that the amount of aniline necessary to effect the reaction is considerably less than that required when litharge alone is employed.

In experimenting with the foregoing method of producing triphenylguanidine, it was found desirable to employ a certain percentage of litharge, because the lead sulphide formed from the lead carbonate alone does not settle as rapidly in the decantation process used to separate triphenylguanidine, as when some litharge is employed. The introduction of a certain amount of litharge expedites the separation of the triphenylguanidine because the larger lead sulphide particles secured from the litharge effect a more rapid settling action.

The following materials may be employed in the amounts specified to produce triphenylguanidine with a high yield, which is furthermore of high purity.

85 lbs. thiocarbanilide.

15 lbs. litharge, 100 lbs. basic lead carbonate = approximately 20% excess lead.

If such mixture is placed in a suitable mixing kettle and mixed dry for a short time to secure a uniform distribution, 36 lbs. of aniline may then be added, which is from 4% to 5% in excess of the amount of aniline necessary. The mixture should then be heated to a temperature of approximately 100° C. for a period of from forty-five minutes to one hour, while agitating the mixture. During the last portion of the reaction period, the water that is formed is removed by distillation. Benzol is then added in the amount of about one gallon for each pound of triphenylguanidine estimated to be in the reaction mixture. The lead sulphide that is formed settles quickly and the supernatent liquid is then drawn off to a still. Another like quantity of benzol is then added to the lead sulphide residue, which is well stirred and then transferred to a second settling tank.

The triphenylguanidine is then obtained by distillation of the benzol and will be found to be in the neighborhood of 90% of the amount of theoretical yield and approximately 95% pure. The purity may be increased to a still higher percentage by recrystallization from alcohol. The reaction that occurs in the production of triphenylguanidine is probably represented by the following equation:

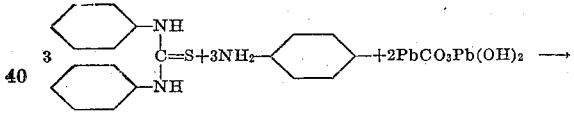 → 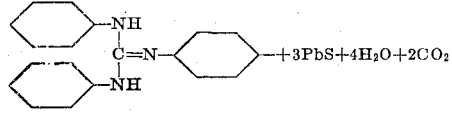

The foregoing discussion has dealt principally with the production of triphenylguanidine, and it is with this accelerator that the invention is particularly concerned. However, other tri-substituted guanidines may be produced, such, for example, as triorthotolyl guanidine, by substituting diorthotolylthiourea for the thiocarbanilide, and orthotoluidine for the aniline. The lead carbonate and litharge are employed in this latter mixture, the same as in the production of triphenylguanidine. Another tri-substituted guanidine that may be produced by this method is triparatolyl guanidine, by employing diparatolylthiourea and paratoluidine with the lead carbonate and litharge.

There are also some tri-substituted guanidines that may be produced by the foregoing method which may be termed mixed guanidines. For example, if orthotoluidine be substituted for the aniline and mixed with the thiocarbonilide and lead carbonate, diphenylorthotolyl guanidine may be obtained. Also, diorthotolylphenyl guanidine may be produced by utilizing diorthotolylthiourea in a mixture with aniline and lead carbonate.

Although I have specifically described a method of producing triphenylguanidine and mentioned a plurality of other tri-substituted guanidines that may be similarly produced, it is obvious that my invention should not be confined to the details of the method set forth, nor to the specific materials mentioned, and it is desired, therefore, that no limitations shall be imposed, except such as are indicated in the appended claims.

What I claim is:

1. A method of making substituted guanidines which comprises admixing basic lead carbonate and litharge with a thiourea, adding a primary amine thereto, applying heat and collecting the guanidine thus produced.

2. A method of making substituted guanidines which comprises admixing a desulfurizing agent including basic lead carbonate with a thiourea in a dry state, adding aniline thereto, applying heat and collecting the guanidine thus produced.

3. A method of making tri-substituted guanidine which comprises admixing a desulfurizing agent including basic lead carbonate with thiocarbanilide in a dry state, adding aniline thereto, applying heat and collecting the guanidine thus formed.

4. A method of making tri-substituted guanidines which comprises admixing a desulfurizing agent including basic lead carbonate with thiocarbanilide in a dry state, adding aniline thereto, heating such mixture to a temperature of approximately 100° C. and collecting the guanidine thus produced.

5. A method of making tri-substituted guanidines which comprises admixing basic lead carbonate and litharge with thiocarbanilide, adding aniline to the mixture, heating the mixture to a temperature of approximately 100° C. and collecting the guanidine thus produced.

6. A method of making tri-substituted guanidines which comprises admixing basic lead carbonate and litharge with thiocarbanilide, adding an excess amount of aniline to the mixture, heating the mixture to a temperature of approximately 100° C. for a period of 45 minutes to 60 minutes, agitating the mixture during such period, adding benzol to dissolve the guanidine thus formed and separating and collecting the guanidine.

In witness whereof, I have hereunto signed my name.

LORIN B. SEBRELL.